Aug. 7, 1951  A. NYSTROM  2,563,737
SAFETY STAKE FOR LOGGING BUNKS
Filed Aug. 28, 1948  2 Sheets-Sheet 1

INVENTOR.
Adrian Nystrom
BY
Atty.

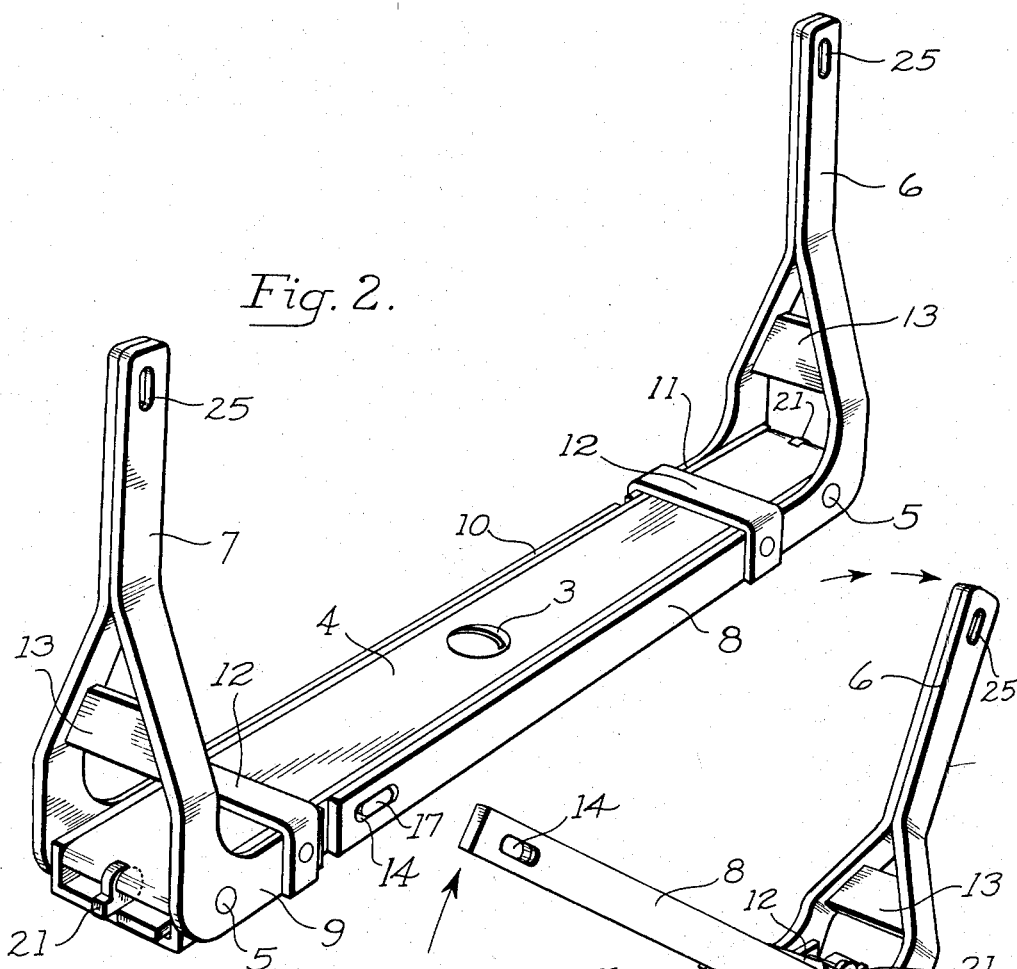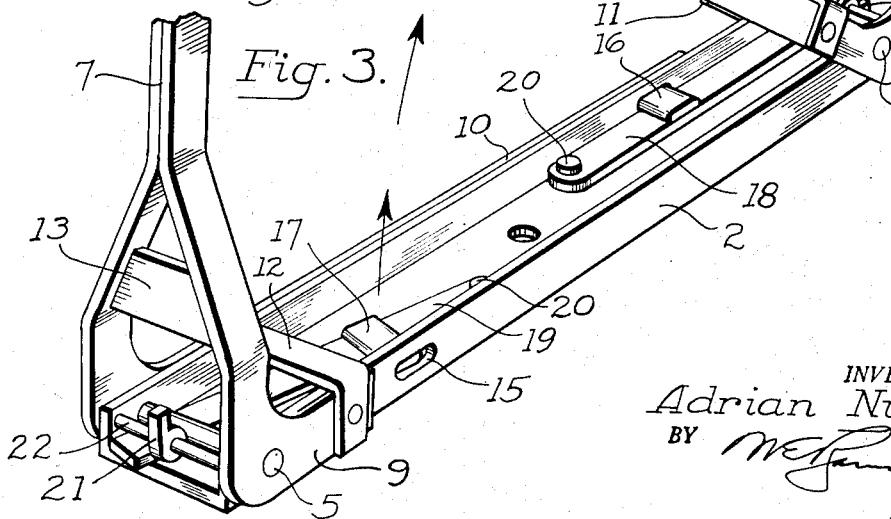

Patented Aug. 7, 1951

2,563,737

UNITED STATES PATENT OFFICE 2,563,737

SAFETY STAKE FOR LOGGING BUNKS

Adrian Nystrom, Molalla, Oreg.

Application August 28, 1948, Serial No. 46,580

12 Claims. (Cl. 280—145)

1

My invention pertains to logging bunks for vehicles, and relates particularly to a logging bunk construction in which the weight of the logs is utilized to maintain the safety stakes of the bunk in supporting position.

It is a principal object of my invention to provide a logging bunk in which L-shaped frames constitute both vertical side safety stakes and horizontal log supports, whereby the weight of the logs upon the latter prevents the safety stakes from tipping outwardly, thus eliminating the possibility of accidental release of logs therefrom.

Another object of my invention is to provide novel means for releasing the safety stakes on one side of the vehicle from the opposite side thereof, that is from the non-discharge side of the vehicle, thus insuring the safety of the operator during the unloading of the logging vehicle.

A further object is to provide a logging bunk equipped with safety stakes of sturdy construction, affording the stability of log chocks of common use as well as the greater holding capacity of stakes.

These and other objects and advantages of my invention will appear from the following detailed description taken in connection with the accompanying drawings, in which:

Fig. 2 is a perspective view showing the safety stakes disposed in operative, or supporting, position upon the logging bunk of my invention; and Fig. 3 is a perspective view illustrating one of the safety stakes in released, or unloading, position, the direction of movement toward discharge position being indicated by arrows.

Figure 1:
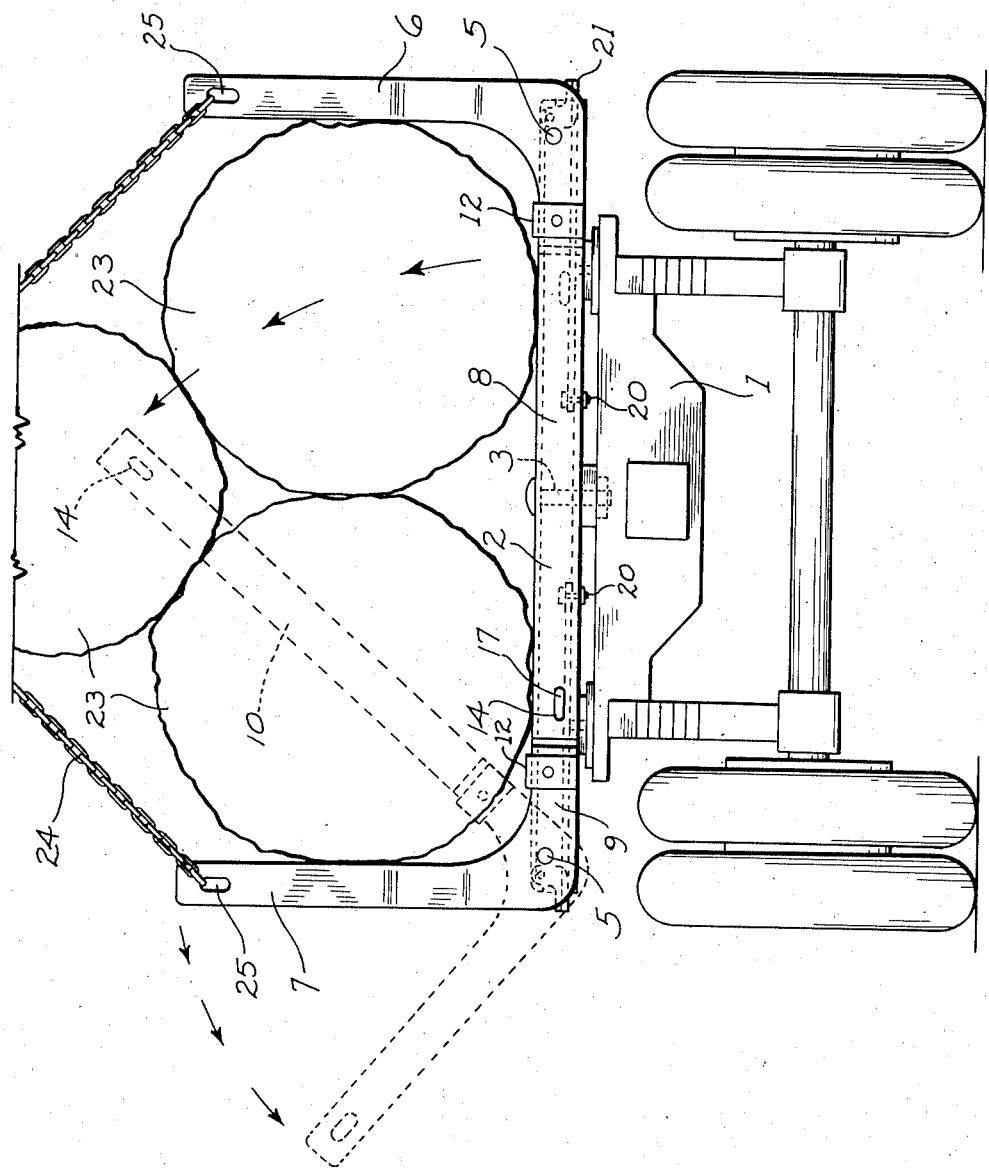
Fig. 1 is an end view of a logging trailer illustrating the features of the log supporting bunk having safety stakes at the end thereof and embodying my invention, one of said safety stakes being outlined in broken lines to indicate its position when it is pivoted toward discharge position, the movement being indicated by arrows.

Fig. 1 of the drawings shows a structure embodying my invention mounted upon the transverse frame member 1 of a logging trailer, although the structure may be adapted with equal facility for use on railway cars and other logging vehicles. A pair of elongated channel-shaped base members 2 extend the full width of the log carrier and each is pivotally mounted at its center on the transverse frame member by means of a king bolt 3. This pivot permits the base member to rotate slightly as the vehicle is maneuvered over the highways. The king bolt projects through the removable cover plate 4 which extends over the exposed area of the base

2 member, thereby forming an enclosed box-like structure. The cover is provided to protect the latching mechanism disposed in the channel of the base member from becoming clogged with wood chips and other debris which would otherwise accumulate therein. Similarly, without the cover plate, the edges of the base member may cut into the logs supported thereon and the latter may thus enter the channel and jam the latching mechanism.

L-shaped frame members are pivotally mounted at their point of divergence on the ends of each base member by means of pins 5. For convenience, these pins extend transversely through the sides of the base member at the ends thereof and provide end brackets upon which the cover plate 4 may be mounted. Each of the L-shaped frame members defines vertical safety stakes 6 and 7, respectively, and a bifurcated horizontal portion. The bifurcated portion defines a pair of spaced horizontal arms which are bent at right angles to the vertical stake and project longitudinally along the outer sides of the channel shaped base member. The arms of each pair are of different lengths, one of the arms extending substantially the full length of the base, or at least a major portion thereof, while the other arm terminates a short distance from the pivot point defined by the pin 5. The longer arms are disposed on opposite sides of the base member, as are the shorter arms of each frame. Thus, the longer arm 8 of stake 6 is disposed on the same side of the base as is the shorter arm 9 of stake 7. The longer arm 10 of stake 7 and the shorter arm 11 of stake 6 are disposed on the other side of the base.

An inverted U-shaped bracket 12 extends across the base member and is secured at one end to the short arm and at the other end to the long arm of each frame member. The bracket functions to maintain said arms in rigid spaced relation. A spacer brace 13 may be disposed between the spaced upright arms to insure adequate strength. The frame member is pivoted about pin 5 and may lie within the sides of the base member, or along the outer edges thereof, as desired.

A slotted aperture 14 is formed near the end of the long arm of each frame member and aligns with a similar aperture 15 formed in the sides of the base member 2 when the horizontal arms are in log-supporting position. The apertures are proportioned and arranged to receive the tongues 16—17 projecting laterally from the latch bars 18—19, respectively. The latch bars are pivotally secured to the base member at their inner ends by means of pivot pins 20. It is to be noted that the tongue 17 on latch bar 19 is actuated from one side of the vehicle to release the safety stake 6 at the opposite end of the base. In similar manner, tongue 16 on latch bar 18 is actuated to release stake 7 from the opposite end of the base. This insures the safety of the operator during the unloading operation. A catch 21 is mounted on the transverse rod 22 extending between the side plates of the base member. The catch may be rotated about said rod but is prevented from sliding longitudinally thereover. This catch releasably secures the latch bar in locking position to prevent accidental release of the long arm of the frame member.

In operation, the safety stakes are arranged in the position shown in Fig. 2 and logs 23 are placed upon the base between the stakes. It is to be noted that the upper edge of the horizontal arms of the frame members lie in the plane of the upper face of the base. In this manner the logs are supported not only by the base member but also by the horizontal arms of the frame members. A safety chain 24 is secured in slots 25 or other securing means provided at the upper end of the vertical stakes, and is passed over the top of the load to prevent dislodging or shifting of the logs.

With the logs resting upon the long horizontal arms of the frame members, the vertical stakes are thus restrained against tipping outwardly about the pivot pin 5 due to the lateral pressure exerted by the logs. For example, the lateral pressure exerted upon stake 7 at the point of contact with the adjacent log tends to rock the stake outwardly about the pivot pin 5. The weight of a log arranged adjacent stake 6, however, produces a force acting downwardly upon the long arm 10 of stake 7. This force is proportionately greater than the lateral force exerted on stake 7 because of the greater distance from the pivot pin 5 to the force acting on arm 10. If the horizontal arms of the frame members are not of sufficient length to underlie the log adjacent the opposite vertical stakes, the lateral pressure exerted by the logs is resisted by the tongues of the latch bars which are accommodated within the registering pairs of apertures formed in the sides of the base and in the horizontal arms of the frame members.

In the unloading of logs from the logging bunk of my invention, it is usually desirable that the logs be lifted, as by means of the usual cable systems. Thus, referring to Fig. 1 of the drawings, the chain 24 is first removed and the catch 21 at the right side of the base member is raised to release the latch bar 18. The latch bar is then moved in a clockwise direction, as viewed in Fig. 3 with regard to the other stake 7, to withdraw the tongue 16 from the registering apertures 14 and 15, thereby releasing the long arm 10 of the safety stake 7. A cable, if used, is reeved under the load and is raised upwardly along the right side thereof. The load of logs is thereby lifted in the bight of said cable, and the safety stake 7 pivots in a counterclockwise direction about its pivot pin 5. When the greater proportion of the weight of the load is shifted from the long arm 10 to the vertical stake 7, the frame member pivots outwardly and discharges the load. The frame is then returned manually and locked in its operative position.

There are a plurality of bunks usually provided on each vehicle, or upon associated vehicles if the log carrying vehicle is a truck-and-trailer unit. In this case the structures hereinabove described are duplicated so that the logs are held longitudinally in alignment with the vehicle. The structure and function of said parts are similar or identical, and thus but one set is shown and described herein.

I claim:

1. A log carrying bunk for a vehicle comprising, an elongated base extending transversely of said vehicle, and L-shaped frame members pivotally mounted at their point of divergence on the ends of said base, each of said frame members defining a vertical stake and a horizontal arm of greater length than its associated stake, said horizontal arms lying longitudinally of said base for substantially the entire length thereof in log-supporting position and adapted to engage logs supported thereon, whereby the weight of said logs is utilized to prevent the vertical stakes from tipping outwardly and discharging the load.

2. A log carrying bunk for a vehicle comprising, an elongated box-like base extending transversely of said vehicle, and L-shaped frame members pivotally mounted at their point of divergence on the ends of said base, each of said frame members defining a vertical stake and a horizontal arm of greater length than its associated stake, the upper edge of said horizontal arms lying longitudinally along opposite outer sides of said base for substantially the entire length thereof in the plane of the upper face of said base in log-supporting position and adapted to engage logs supported thereon, whereby the weight of said logs is utilized to prevent the vertical stakes from tipping outwardly and discharging the load.

3. A log carrying bunk for a vehicle comprising, an elongated base extending transversely of said vehicle, and L-shaped frame members pivotally mounted on the ends of said base, each of said frame members defining a vertical stake and a bifurcated horizontal portion, said bifurcated portion defining spaced horizontal arms of different lengths, one arm extending a major portion of the length of said base and the other arm occupying a minor portion thereof, said longer horizontal arms lying longitudinally along opposite sides of said base in log supporting position and adapted to engage logs supported thereon, whereby the weight of said logs is utilized to prevent the vertical stakes from tipping outwardly and discharging the load.

4. A log carrying bunk for a vehicle comprising, an elongated base extending transversely of said vehicle, L-shaped frame members pivotally mounted at their point of divergence on the ends of said base, each of said frame members defining a vertical stake and a horizontal arm of greater length than its associated stake, said horizontal arms lying longitudinally of said base in log supporting position and adapted to engage logs supported thereon, said base and the adjacent longer horizontal arms having apertures formed therein arranged to register with each other when said arms are in log-supporting position.

5. A log carrying bunk for a vehicle comprising, an elongated box-like base extending transversely of said vehicle, L-shaped frame members pivotally mounted at their point of divergence on the ends of said base, each of said frame members defining a vertical stake and a horizontal arm, said horizontal arms lying longitudinally along opposite outer sides of said base in log supporting position and adapted to engage logs supported thereon, the sides of said base and the adjacent longer horizontal arms having apertures formed therein arranged to register with each other when said arms are in log-supporting position, at least one latch bar pivotally mounted within said base and extending to the side of the vehicle, and a tongue extending laterally from said latch bar constructed and arranged to be accommodated within one pair of said registering apertures for detachably locking the horizontal arm of the frame member pivotally mounted at the opposite end of the base in log-supporting position.

6. A log carrying bunk for a vehicle comprising, an elongated base extending transversely of said vehicle, L-shaped frame members pivotally mounted at their point of divergence on the ends of said base, each of said frame members defining a vertical stake and bifurcated horizontal arms of different lengths, one arm extending a major portion of the length of said base and the other arm occupying a minor portion thereof, said longer horizontal arms lying longitudinally of said base in log-supporting position and adapted to engage logs supported thereon, said base and the adjacent longer horizontal arms having apertures formed therein arranged to register with each other when said arms are in log-supporting position, latch bars pivotally mounted on said base and extending to opposite sides of the vehicle, a tongue extending laterally from each of said latch bars constructed and arranged to be accommodated within opposite pairs of said registering apertures for detachably locking the horizontal arms of the frame members pivotally mounted at opposite ends of the base in log-supporting position, and a releasable catch on said base adjacent the free end of said latch bars for holding the latter in locking position.

7. A log carrying bunk for a vehicle comprising, an elongated channel-shaped base extending transversely of said vehicle, L-shaped frame members pivotally mounted on the ends of said base, each of said frame members defining a vertical stake and a bifurcated horizontal portion, said bifurcated portion defining spaced horizontal arms of different lengths, one arm extending a major portion of the length of said base and the other arm occupying a minor portion thereof, a bracket joining said arms and spanning said base at a point adjacent the pivot axis of said frame members, the upper edge of said longer horizontal arms lying longitudinally along opposite sides of said base in the plane of the upper face of said base in log-supporting position and adapted to engage logs supported thereon, the sides of said base and the adjacent longer horizontal arms having apertures formed therein arranged to register with each other when said arms are in log-supporting position, latch means cooperating with said apertures for detachably locking said arms in log-supporting position, and a removable cover extending over said channel-shaped base for protecting the operating parts of said bunk.

8. A log carrying bunk for a vehicle comprising, an elongated channel-shaped base extending transversely of said vehicle, L-shaped frame members pivotally mounted at their point of divergence on the ends of said base, each of said frame members defining a vertical stake and a horizontal arm, said horizontal arms lying longitudinally along opposite sides of said base in log-supporting position and adapted to engage logs supported thereon, whereby the weight of said logs is utilized to prevent the vertical stakes from tipping outwardly and discharging the load, the sides of said base and the adjacent longer horizontal arms having apertures formed therein arranged to register with each other when said arms are in log-supporting position, at least one latch bar pivotally mounted on said base and extending to the side of the vehicle, a tongue extending laterally from said latch bar constructed and arranged to be accommodated within one pair of said registering apertures for detachably locking the horizontal arm of the frame member pivotally mounted at the opposite end of the base in log-supporting position, and a releasable catch on said base adjacent the free end of said latch bar for holding the latter in locking position.

9. A log carrying bunk for a vehicle comprising, an elongated channel-shaped base extending transversely of said vehicle, L-shaped frame members pivotally mounted at their point of divergence on the ends of said base, each of said frame members defining a vertical stake and a horizontal arm of greater length than its associated stake, said horizontal arms lying longitudinally of said base in log-supporting position and adapted to engage logs supported thereon, whereby the weight of said logs is utilized to prevent the vertical stakes from tipping outwardly and discharging the load, the sides of said base and the adjacent longer horizontal arms having apertures formed therein arranged to register with each other when said arms are in log-supporting position, latch means cooperating with said apertures for detachably locking said arms in log-supporting position, and a removable cover extending over said channel-shaped base for protecting the operating parts of said bunk.

10. A log carrying bunk for a vehicle comprising, an elongated box-like base extending transversely of said vehicle, L-shaped frame members pivotally mounted at their point of divergence on the ends of said base, each of said frame members defining a vertical stake and a bifurcated horizontal portion, said bifurcated portion defining spaced horizontal arms of different lengths, one arm extending a major portion of the length of said base and the other arm occupying a minor portion thereof, the upper edge of said longer horizontal arms lying longitudinally along opposite outer sides of said base in the plane of the upper face of said base in log-supporting position and adapted to engage logs supported thereon, whereby the weight of said logs is utilized to prevent the vertical stakes from tipping outwardly and discharging the load, the sides of said base and the adjacent longer horizontal arms having apertures formed therein arranged to register with each other when said arms are in log-supporting position, at least one latch bar pivotally mounted within said base and extending to the side of the vehicle, a tongue extending laterally from said latch bar constructed and arranged to be accommodated within one pair of said registering apertures for detachably locking the horizontal arm of the frame member pivotally mounted at the opposite end of the base in log-supporting position, and a releasable catch on said base adjacent the free end of said latch bar for holding the latter in locking position.

11. A log carrying bunk for a vehicle comprising, an elongated channel-shaped base extending transversely of said vehicle, L-shaped frame members pivotally mounted at their point of divergence on the ends of said base, each of said frame members defining a vertical stake and a bifurcated horizontal portion, said bifurcated portion defining spaced horizontal arms of different lengths, one arm extending a major portion of the length of said base and the other arm occupying a minor portion thereof, said longer horizontal arms lying longitudinally of said base in log-supporting position and adapted to engage logs supported thereon, the sides of said base and the adjacent longer horizontal arms having apertures formed therein arranged to register with each other when said arms are in log-supporting position, latch bars pivotally mounted within said base and extending to the sides of the vehicle, a tongue extending laterally from each of said latch bars constructed and arranged to be accommodated within opposite pairs of said registering apertures for detachably locking the horizontal arms of the frame members pivotally mounted at the opposite ends of the base in log-supporting position, a releasable catch on said base adjacent the free end of said latch bars for holding the latter in locking position, and a removable cover extending over said channel-shaped base for protecting the operating parts of said bunk.

12. A log carrying bunk for a vehicle comprising, an elongated base extending transversely of said vehicle and pivotally mounted thereon at its middle by a king bolt, L-shaped frame members pivotally mounted at their point of divergence on the ends of said base, each of said frame members defining a vertical stake and a horizontal arm, means at the extremity of said stakes for connecting a safety chain thereto, the upper edge of said horizontal arms lying longitudinally along opposite outer sides of said base for substantially the entire length thereof, and in the plane of the upper face of said base in log-supporting position and adapted to engage logs supported thereon, said base and the adjacent longer horizontal arms having apertures formed therein arranged to register with each other when said arms are in log-supporting position, and latch means cooperating with said apertures for detachably locking said arms in log-supporting position.

ADRIAN NYSTROM.

REFERENCES CITED

The following references are of record in the file of this patent:

UNITED STATES PATENTS

| Number | Name | Date |
|---|---|---|
| 948,159 | Brown | Feb. 1, 1910 |
| 2,161,734 | Wheles | June 6, 1939 |
| 2,331,416 | Muller | Oct. 12, 1943 |